(12) United States Patent
Francois et al.

(10) Patent No.: US 12,445,618 B2
(45) Date of Patent: Oct. 14, 2025

(54) METHOD AND DEVICE FOR PREDICTIVE PICTURE ENCODING AND DECODING

(71) Applicant: INTERDIGITAL VC HOLDINGS, INC., Wilmington, DE (US)

(72) Inventors: Edouard Francois, Bourg des Comptes (FR); Christophe Chevance, Brece (FR); Franck Hiron, Chateaubourg (FR)

(73) Assignee: INTERDIGITAL VC HOLDINGS, INC., Wilmington, DE (US)

(*) Notice: Subject to any disclaimer, the term of this patent is extended or adjusted under 35 U.S.C. 154(b) by 407 days.

(21) Appl. No.: 17/844,462

(22) Filed: Jun. 20, 2022

(65) Prior Publication Data

US 2022/0385913 A1 Dec. 1, 2022

Related U.S. Application Data

(63) Continuation of application No. 16/603,568, filed as application No. PCT/EP2018/056479 on Mar. 15, 2018, now Pat. No. 11,368,695.

(30) Foreign Application Priority Data

Apr. 7, 2017 (EP) .................................... 17305411

(51) Int. Cl.
*H04N 19/132* (2014.01)
*H04N 19/136* (2014.01)
(Continued)

(52) U.S. Cl.
CPC ......... *H04N 19/132* (2014.11); *H04N 19/136* (2014.11); *H04N 19/176* (2014.11); *H04N 19/186* (2014.11)

(58) Field of Classification Search
CPC ...... H04N 19/176; H04N 19/186; H04N 9/64; H04N 19/70; H04N 19/105; H04N 19/103; H04N 19/132
See application file for complete search history.

(56) References Cited

U.S. PATENT DOCUMENTS

| 6,108,449 A | 8/2000 | Sekiguchi |
| 6,154,572 A | 11/2000 | Chaddha |

(Continued)

FOREIGN PATENT DOCUMENTS

| CN | 102084653 A | 6/2011 |
| CN | 102132563 A | 7/2011 |

(Continued)

OTHER PUBLICATIONS

Spaulding, K., et al. "Using A Residual Image To Extend The Color Gamut And Dynamic Range Of An sRGB Image." In IS and TS Pics Conference, Society for Imaging Science & Technology, 2003, pp. 307-314 (8 pages).

(Continued)

*Primary Examiner* — Daniel Chang
(74) *Attorney, Agent, or Firm* — Klintworth & Rozenblat LLP

(57) ABSTRACT

A method for encoding a block of a picture comprising, for at least one sample of the block and for one current component: obtaining a prediction value; determining a mapped residual value from a source value of the sample and from the prediction value responsive to a mapping function; and encoding the mapped residual value into a bitstream; wherein the mapping function is derived to obtain at least one of a reduction of a bit cost of the bitstream for a given quality of reconstruction or an increase of quality of reconstruction for a given bit cost of the bitstream.

12 Claims, 9 Drawing Sheets

(51) Int. Cl.
*H04N 19/176* (2014.01)
*H04N 19/186* (2014.01)

(56) References Cited

U.S. PATENT DOCUMENTS

| | | | |
|---|---|---|---|
| 9,066,070 B2 | 6/2015 | Su | |
| 9,100,661 B2 | 8/2015 | Alshina | |
| 9,544,610 B2 | 1/2017 | Efremov | |
| 9,832,464 B2* | 11/2017 | Lee | H04N 19/593 |
| 2006/0103861 A1 | 5/2006 | Klassen | |
| 2013/0108183 A1 | 5/2013 | Bruls | |
| 2013/0114696 A1* | 5/2013 | Liu | H04N 19/103 |
| | | | 375/240.03 |
| 2013/0188696 A1* | 7/2013 | Liu | H04N 19/50 |
| | | | 375/240.12 |
| 2013/0188703 A1* | 7/2013 | Liu | H04N 19/50 |
| | | | 375/240.12 |
| 2013/0188705 A1* | 7/2013 | Liu | H04N 19/50 |
| | | | 375/240.12 |
| 2013/0272396 A1* | 10/2013 | Liu | H04N 19/119 |
| | | | 375/240.12 |
| 2013/0294689 A1* | 11/2013 | Jia | H04N 19/136 |
| | | | 382/166 |
| 2014/0023139 A1* | 1/2014 | Xu | H04N 19/176 |
| | | | 375/240.12 |
| 2014/0153642 A1* | 6/2014 | Hattori | H04N 19/186 |
| | | | 375/240.03 |
| 2014/0247869 A1 | 9/2014 | Su | |
| 2015/0016512 A1* | 1/2015 | Pu | H04N 19/147 |
| | | | 375/240.03 |
| 2015/0124865 A1* | 5/2015 | Kim | H04N 19/105 |
| | | | 375/240.12 |
| 2015/0172661 A1 | 6/2015 | Dong | |
| 2015/0373349 A1* | 12/2015 | Zhang | H04N 19/13 |
| | | | 375/240.02 |
| 2016/0219283 A1* | 7/2016 | Chen | H04N 19/105 |
| 2016/0277762 A1* | 9/2016 | Zhang | H04N 19/593 |
| 2016/0323556 A1 | 11/2016 | Luginbuhl | |
| 2016/0360235 A1 | 12/2016 | Ramasubramonian | |
| 2016/0366423 A1 | 12/2016 | Laserre | |
| 2017/0085896 A1 | 3/2017 | Ramasubramonian | |
| 2017/0127085 A1 | 5/2017 | Sun | |
| 2017/0272749 A1* | 9/2017 | Pettersson | H04N 19/17 |
| 2017/0332098 A1 | 11/2017 | Rusanovskyy | |
| 2017/0345187 A1* | 11/2017 | Sato | H04N 23/72 |
| 2017/0359595 A1* | 12/2017 | Zhang | H04N 19/186 |
| 2017/0366818 A1* | 12/2017 | Zhang | H04N 19/159 |
| 2018/0176594 A1* | 6/2018 | Zhang | H04N 19/59 |
| 2020/0288126 A1* | 9/2020 | Hu | H04N 19/96 |
| 2020/0396458 A1 | 12/2020 | Francois | |
| 2021/0266604 A1 | 8/2021 | Du | |

FOREIGN PATENT DOCUMENTS

| | | | |
|---|---|---|---|
| EP | 0624036 | A1 | 11/1994 |
| FR | 2618623 | A1 | 1/1989 |
| FR | 2767623 | A1 | 2/1999 |
| WO | 2015177126 | A1 | 11/2015 |
| WO | 2015196119 | A1 | 12/2015 |
| WO | 2016066028 | A1 | 5/2016 |
| WO | 2016164235 | A1 | 10/2016 |
| WO | WO-2020156532 | A1 * | 8/2020 ........... H04N 19/132 |

OTHER PUBLICATIONS

Kawamura, K., et al. "Chroma intra prediction based on residual luma samples." In Joint Collaborative Team on Video Coding (JCT-VC) of ITU-T SG16 WP3 and ISO/IEC JTC1/SC29/WG11, 7th Meeting: Geneva, CH, Nov. 2011 (3 pages).

Salih et al. / Salih et al., "Tone Mapping of HDR Images: A Review", 2012 4th International Conference on Intelligent and Advanced Systems (ICIAS 2012), Kuala Lumpur, Malaysia, Jun. 12, 2012, pp. 368-373 (6 pages).

Spaulding et al. / Spaulding et al., "Extending the Color Gamut and Dynamic Range of an sRGB Image Using a Residual Image", Color Research & Application, vol. 28, No. 4, Aug. 2003, pp. 251-266 (16 pages).

Mantiuk / Mantiuk, R., "Multidimensional Retargeting: Tone Mapping", 4th ACM SIGGRAPH Conference and Exhibition on Computer Graphics and Interactive Techniques in Asia (SIGGRAPH Asia 2011), Hong Kong, Dec. 12, 2011 (75 pages).

Mir et al. / Mir et al., "Adaptive Residual Mapping for an Efficient Extension Layer Coding in Two-Layer HDR Video Coding", 2016 IEEE International Conference on Image Processing (ICIP), Phoenix, Arizona, USA, Sep. 25, 2016, pp. 1394-1398 (5 pages).

Marpe et al. / Marpe et al., "Macroblock-Adaptive Residual Color Space Transforms For 4:4:4 Video Coding", 2006 International Conference on Image Processing, Atlanta, Georgia, USA, Oct. 8, 2006, pp. 3157-3160 (4 pages).

Chen, J., et al. "CE6.a: Chroma intra prediction by reconstructed luma samples" In Joint Collaborative Team on Video Coding (JCT-VC) of ITU-T SG16 WP3 and ISO/IEC JTC1/SC29/WG11, JCTVC-E266, 5th Meeting: Geneva, CH, Mar. 2011 (7 pages).

\* cited by examiner

METHOD AND DEVICE FOR PREDICTIVE PICTURE ENCODING AND DECODING

CROSS-REFERENCE TO RELATED APPLICATIONS

This application is a continuation of U.S. patent application Ser. No. 16/603,568, filed Oct. 7, 2019, which is incorporated herein by reference in its entirety and which is a national stage application under 35 U.S.C. § 371 of International Application PCT/EP2018/056479, filed Mar. 15, 2018, which was published in accordance with PCT Article 21 (2) on Oct. 11, 2018, in English, and which claims the benefit of European Patent Application No. 17305411.5, filed Apr. 7, 2017.

1. TECHNICAL FIELD

The present principles generally relate to a method and a device for picture encoding and decoding, and more particularly, to a method and a device for encoding and decoding a block of a picture.

2. BACKGROUND ART

New generation video formats include wider color gamut, higher frame rate, and higher dynamic range. New standards have been created to support this type of content. For example, ITU-R Recommendation BT-2020 defines a format that includes color primaries outside of the currently deployed BT-709 gamut. ITU-R Recommendation BT-2100 defines a format that includes transfer functions enabling to extend the dynamic range of the content with respect to BT.709. Color primaries in BT-2100 are the same as the color primaries of BT-2020.

Using a BT.709 container or a BT.2100 container leads to noticeably different codewords distribution. Most of the coding tools developed so far focus on SDR signals, using a BT.709 container. When moving to wider containers, such as a BT.2100 container adaptations or changes in the codec design may be required. There is thus a need to "re-shape" or map the sample values before coding in order to modify the sample values in the new container to better fit the properties expected by current codecs and encoders, such as for example HEVC.

It is known to perform mapping/reshaping of the samples represented in a given container, e.g. BT.2100, before their encoding in order to get samples distribution that is similar to a distribution of initial input samples, e.g. BT. 709. An inverse mapping is applied on the decoded samples. Mapping prior to the encoding and inverse mapping after decoding distort the signal. Indeed, the mapping and inverse mapping processes both apply in fixed-point precision which generates loss of information. This distortion cumulates with the distortion of the coding process and results in a loss of coding performance.

Instead of "re-shaping" the sample values before coding, an alternative approach to handle the new containers is to modify the quantization step for quantizing the coefficients of the transformed prediction residual. To this aim, it is known to adapt the quantization step, applied, for a given block of samples, to the coefficients resulting from the transform (e.g. DCT) of the prediction residual samples, based on a value deduced from the prediction, original or reconstructed samples of this block. Adapting the quantization step per block may be inefficient, especially in the case where a block includes samples having many different values, for instance bright samples as well as dark samples.

3. BRIEF SUMMARY

A method for encoding a block of a picture is disclosed that comprises for at least one sample of the block and for one current component:
  obtaining a prediction value;
  determining a mapped residual value from a source value of the sample and from the prediction value responsive to a mapping function; and
  encoding the mapped residual value into a bitstream;
wherein the mapping function is derived to obtain at least one of a reduction of a bit cost of the bitstream for a given quality of reconstruction or an increase of quality of reconstruction for a given bit cost of the bitstream.

A device for encoding a block of a picture comprising:
  means for obtaining a prediction value for at least one sample of the block and for one current component;
  means for determining a mapped residual value from a source value of the sample and from the prediction value responsive to a mapping function; and
  means for encoding the mapped residual value into a bitstream;
wherein the mapping function is derived to obtain at least one of a reduction of a bit cost of the bitstream for a given quality of reconstruction or an increase of quality of reconstruction for a given bit cost of the bitstream.

In variant, an encoding device is disclosed that comprises a communication interface configured to access a block of a picture and at least one processor configured to:
  obtain a prediction value for at least one sample of the accessed block and for one current component;
  determine a mapped residual value from a source value of the sample and from the prediction value responsive to a mapping function; and
  encode the mapped residual value into a bitstream;
wherein the mapping function is derived to obtain at least one of a reduction of a bit cost of the bitstream for a given quality of reconstruction or an increase of quality of reconstruction for a given bit cost of the bitstream.

A bitstream representative of a block of a picture is disclosed that comprises:
  coded data representative of a mapped residual value wherein the mapped residual value is obtained for at least one sample of the block and for one current component from a source value of the sample and from a prediction value responsive to a mapping function and wherein the mapping function is derived to obtain at least one of a reduction of a bit cost of the bitstream for a given quality of reconstruction or an increase of quality of reconstruction for a given bit cost of the bitstream;
  coded data representative of the mapping function.

In a variant, a non-transitory processor readable medium having stored thereon a bitstream representative of a block of a picture is disclosed, wherein the bitstream comprises:
  coded data representative of a mapped residual value wherein the mapped residual value is obtained for at least one sample of the block and for one current component from a source value of the sample and from a prediction value responsive to a mapping function and wherein the mapping function is derived to obtain at least one of a reduction of a bit cost of the bitstream for a given quality of reconstruction or an increase of quality of reconstruction for a given bit cost of the bitstream;

coded data representative of the mapping function.

A transmitting method is disclosed that comprises:

transmitting coded data representative of a mapped residual value wherein the mapped residual value is obtained for at least one sample of a block of a picture and for one current component from a source value of the sample and from a prediction value responsive to a mapping function and wherein the mapping function is derived to obtain at least one of a reduction of a bit cost of the bitstream for a given quality of reconstruction or an increase of quality of reconstruction for a given bit cost of the bitstream;

transmitting coded data representative of the mapping function.

A transmitting device is disclosed that comprises:

means for transmitting coded data representative of a mapped residual value wherein the mapped residual value is obtained for at least one sample of a block of a picture and for one current component from a source value of the sample and from a prediction value responsive to a mapping function and wherein the mapping function is derived to obtain at least one of a reduction of a bit cost of the bitstream for a given quality of reconstruction or an increase of quality of reconstruction for a given bit cost of the bitstream;

means for transmitting coded data representative of the mapping function.

A transmitting device is disclosed that comprises a communication interface configured to access a block of a picture and at least one processor configured to:

transmit coded data representative of a mapped residual value wherein the mapped residual value is obtained for at least one sample of the block and for one current component from a source value of the sample and from a prediction value responsive to a mapping function and wherein the mapping function is derived to obtain at least one of a reduction of a bit cost of the bitstream for a given quality of reconstruction or an increase of quality of reconstruction for a given bit cost of the bitstream;

transmit coded data representative of the mapping function.

The following embodiments apply to the encoding method, encoding devices, bitstream, processor readable medium, transmitting method and transmitting devices disclosed above.

In a first specific and non-limiting embodiment, determining the mapped residual value comprises:

mapping the source value of the sample with the mapping function;

mapping the prediction value of the sample with the mapping function;

determining the mapped residual value by subtracting the mapped prediction value from the mapped component value.

In a second specific and non-limiting embodiment, determining the mapped residual value comprises:

determining an intermediate residual value by subtracting the prediction value from the source value of the sample; and mapping the intermediate residual value responsive to the mapping function depending on the prediction value.

In a third specific and non-limiting embodiment, mapping the intermediate residual value responsive to the mapping function depending on the prediction value comprises multiplying the intermediate residual value with a scaling factor which depends on the prediction value of the sample.

In a fourth specific and non-limiting embodiment, mapping the intermediate residual value responsive to the mapping function depending on the prediction value comprises multiplying the intermediate residual value with a scaling factor which depends on a prediction value obtained for another component of the sample, the another component being different from the current component.

A method for decoding a block of a picture is disclosed that comprises for at least one sample of the block and for one current component:

obtaining a prediction value;

decoding a residual value for the sample;

determining a reconstructed value for the sample from the decoded residual value and from the prediction value responsive to a mapping function;

wherein the mapping function is derived to obtain at least one of a reduction of a bit cost of the bitstream for a given quality of reconstruction or an increase of quality of reconstruction for a given bit cost of the bitstream.

A device for decoding a block of a picture is also disclosed that comprises:

means for obtaining a prediction value for at least one sample of the block and for one current component;

means for decoding a residual value for the sample;

means for determining a reconstructed value for the sample from the decoded residual value and from the prediction value responsive to a mapping function;

wherein the mapping function is derived to obtain at least one of a reduction of a bit cost of the bitstream for a given quality of reconstruction or an increase of quality of reconstruction for a given bit cost of the bitstream.

In a variant, a decoding device is disclosed that comprises a communication interface configured to access a bitstream and at least one process decoding or configured to:

obtaining a prediction value for at least one sample of the block and for one current component;

decoding a residual value for the sample from the accessed bitstream;

determining a reconstructed value for the sample from the decoded residual value and from the prediction value responsive to a mapping function;

wherein the mapping function is derived to obtain at least one of a reduction of a bit cost of the bitstream for a given quality of reconstruction or an increase of quality of reconstruction for a given bit cost of the bitstream.

The following embodiments apply to the decoding method and decoding devices disclosed above.

In a first specific and non-limiting embodiment, determining the reconstructed value for the sample comprises:

mapping the prediction value of the sample with the mapping function;

mapping the decoded residual value with an inverse function of the mapping function;

determining the reconstructed value by adding the mapped prediction value to the mapped decoded residual value.

In a second specific and non-limiting embodiment, determining the reconstructed value for the sample comprises:

mapping the decoded residual value with an inverse function of the mapping function depending on the prediction value;

determining the reconstructed value by adding the prediction value to the mapped decoded residual value.

In a third specific and non-limiting embodiment, mapping the decoded residual value with an inverse function of the mapping function depending on the prediction value comprises multiplying the decoded residual value with a scaling factor which depends on the prediction value of the sample.

In a fourth specific and non-limiting embodiment, mapping the decoded residual value with an inverse function of the mapping function depending on the prediction value comprises multiplying the decoded residual value with a scaling factor which depends on the prediction value obtained for another component of the sample, the another component being different from the current component.

4. BRIEF SUMMARY OF THE DRAWINGS

5. DETAILED DESCRIPTION

Figure 1:
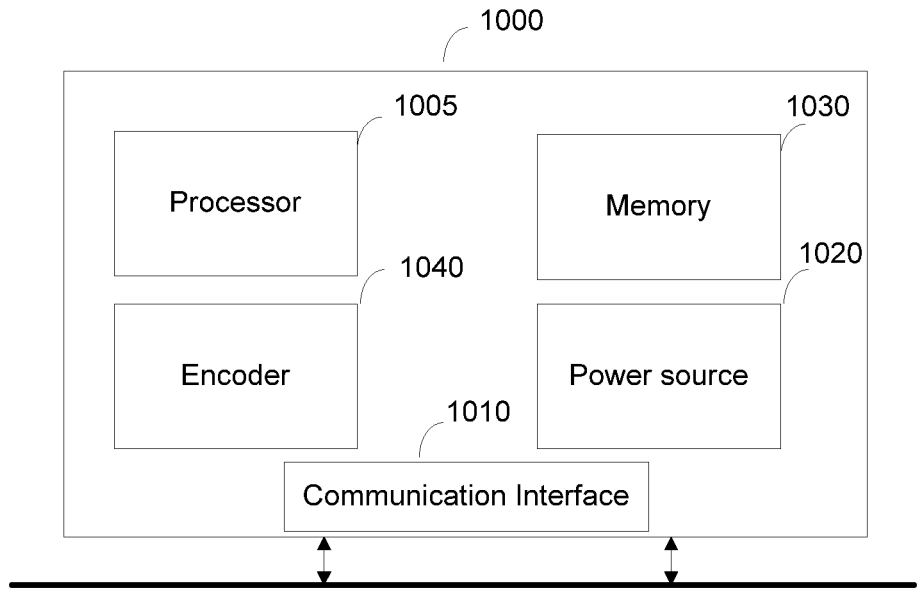
FIG. 1 represents an exemplary architecture of a transmitter configured to encode a picture in a bitstream according to a specific and non-limiting embodiment.

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

A picture is an array of luma samples in monochrome format or an array of luma samples and two corresponding arrays of chroma samples in 4:2:0, 4:2:2, and 4:4:4 colour format. Generally, a "block" addresses a specific area in a sample array (e.g., luma Y), and a "unit" includes the collocated block of all color components (luma Y and possibly chroma Cb and chroma Cr). A slice is an integer number of basic coding units such as HEVC coding tree units or H.264 macroblock units. A slice may consist of a complete picture as well as part thereof. Each slice may include one or more slice segments.

In the following, the word "reconstructed" and "decoded" can be used interchangeably. Usually but not necessarily "reconstructed" is used on the encoder side while "decoded" is used on the decoder side. It should be noted that the term "decoded" or "reconstructed" may mean that a bitstream is partially "decoded" or "reconstructed," for example, the signals obtained after deblocking filtering but before SAO filtering, and the reconstructed samples may be different from the final decoded output that is used for display. We may also use the terms "image," "picture," and "frame" interchangeably. We may also use the terms "sample," and "pixel" interchangeably.

Various embodiments are described with respect to the HEVC standard. However, the present principles are not limited to HEVC, and can be applied to other standards, recommendations, and extensions thereof, including for example HEVC or HEVC extensions like Format Range (RExt), Scalability (SHVC), Multi-View (MV-HEVC) Extensions and H.266. The various embodiments are described with respect to the encoding/decoding of a slice. They may be applied to encode/decode a whole picture or a whole sequence of pictures.

Reference to "one embodiment" or "an embodiment" of the present principles, as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A or B", is intended to encompass the selection of the first listed option (A) only, or the selection of the second listed option (B) only, or the selection of both options (A and B). As a further example, in the cases of "A, B, and/or C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Various methods are described above, and each of the methods comprises one or more steps or actions for achieving the described method. Unless a specific order of steps or actions is required for proper operation of the method, the order and/or use of specific steps and/or actions may be modified or combined.

FIG. 1 represents an exemplary architecture of a transmitter 1000 configured to encode a picture in a bitstream according to a specific and non-limiting embodiment.

The transmitter 1000 comprises one or more processor(s) 1005, which could comprise, for example, a CPU, a GPU and/or a DSP (English acronym of Digital Signal Processor), along with internal memory 1030 (e.g. RAM, ROM, and/or EPROM). The transmitter 1000 comprises one or more communication interface(s) 1010 (e.g. a keyboard, a mouse, a touchpad, a webcam), each adapted to display output information and/or allow a user to enter commands and/or data; and a power source 1020 which may be external to the transmitter 1000. The transmitter 1000 may also comprise one or more network interface(s) (not shown). Encoder module 1040 represents the module that may be included in a device to perform the coding functions. Additionally, encoder module 1040 may be implemented as a separate element of the transmitter 1000 or may be incorporated within processor(s) 1005 as a combination of hardware and software as known to those skilled in the art.

The picture may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network. According to an exemplary and non-limiting embodiment, the transmitter 1000 further comprises a computer program stored in the memory 1030. The computer program comprises instructions which, when executed by the transmitter 1000, in particular by the processor 1005, enable the transmitter 1000 to execute the encoding method described with reference to FIGS. 5A, 6A, 8A, 10A and 11A. According to a variant, the computer program is stored externally to the transmitter 1000 on a non-transitory digital data support, e.g. on an external storage medium such as a HDD, CD-ROM, DVD, a read-only and/or DVD drive and/or a DVD Read/Write drive, all known in the art. The transmitter 1000 thus comprises a mechanism to read the computer program. Further, the transmitter 1000 could access one or more Universal Serial Bus (USB)-type storage devices (e.g., "memory sticks.") through corresponding USB ports (not shown).

According to exemplary and non-limiting embodiments, the transmitter 1000 can be, but is not limited to:
- a mobile device;
- a communication device;
- a game device;
- a tablet (or tablet computer);
- a laptop;
- a still picture camera;
- a video camera;
- an encoding chip or encoding device/apparatus;
- a still picture server; and
- a video server (e.g. a broadcast server, a video-on-demand server or a web server).

Figure 2:
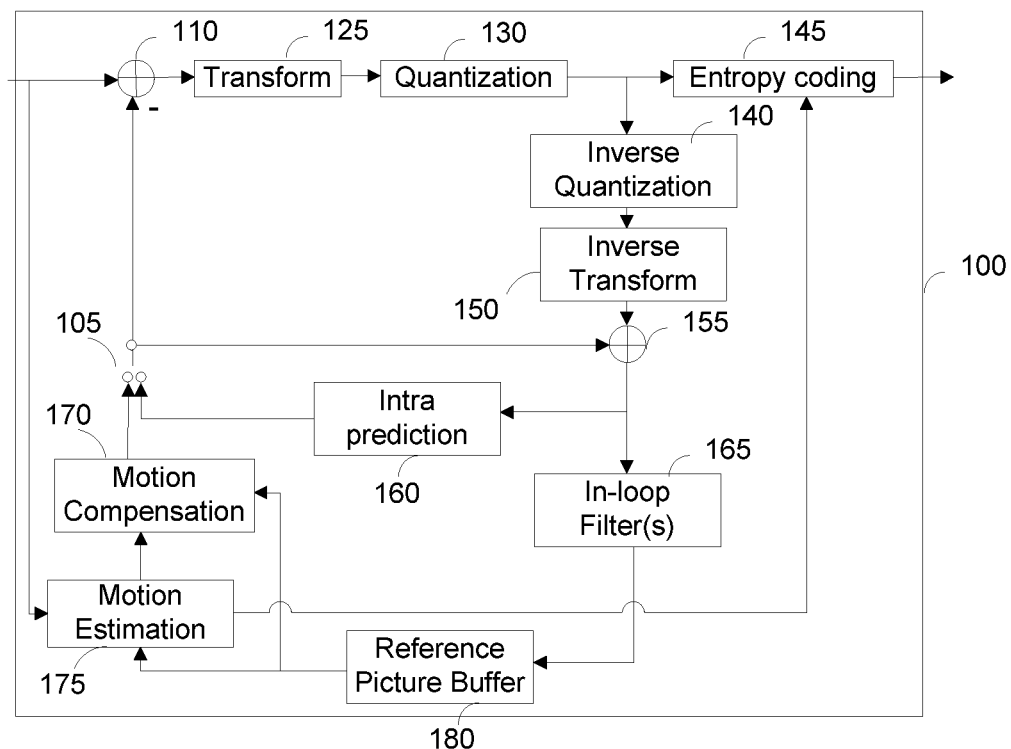
FIG. 2 illustrates an exemplary video encoder, e.g. a HEVC video encoder, adapted to execute the encoding method according to the present principles.

FIG. 2 illustrates an exemplary video encoder 100, e.g. a HEVC video encoder, adapted to execute the encoding method according to one of the embodiments of FIGS. 5A, 6A, 8A, 10A and 11A. The encoder 100 is an example of a transmitter 1000 or part of such a transmitter 1000.

For coding, a picture is usually partitioned into basic coding units, e.g. into coding tree units (CTU) in HEVC or into macroblock units in H.264. A set of possibly consecutive basic coding units is grouped into a slice. A basic coding unit contains the basic coding blocks of all color components. In HEVC, the smallest CTB size 16×16 corresponds to a macroblock size as used in previous video coding standards. It will be understood that, although the terms CTU and CTB are used herein to describe encoding/decoding methods and encoding/decoding apparatus, these methods and apparatus should not be limited by these specific terms that may be worded differently (e.g. macroblock) in other standards such as H.264.

In HEVC, a CTB is the root of a quadtree partitioning into Coding Blocks (CB), and a Coding Block is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Residuals are calculated by subtracting (110) a predicted sample block (also known as a predictor) from the original picture block. The prediction sample block comprises prediction values, one for each sample of the block.

CUs in intra mode are predicted from reconstructed neighboring samples within the same slice. A set of 35 intra prediction modes is available in HEVC, including a DC, a planar and 33 angular prediction modes. The intra prediction reference is reconstructed from the row and column adjacent to the current block. The reference extends over two times the block size in horizontal and vertical direction using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (i.e., motion vector and reference index) can be signaled in two methods, namely, "advanced motion vector prediction (AMVP)" and "merge mode". In AMVP, a video encoder or decoder assembles candidate lists based on motion vectors determined from already coded blocks. The video encoder then signals an index into the candidate lists to identify a motion vector predictor (MVP) and signals a motion vector difference (MVD). At the decoder side, the motion vector (MV) is reconstructed as MVP+MVD.

In the merge mode, a video encoder or decoder assembles a candidate list based on already coded blocks, and the video encoder signals an index for one of the candidates in the candidate list. At the decoder side, the motion vector and the reference picture index are reconstructed based on the signaled candidate.

In HEVC, the precision of the motion information for motion compensation is one quarter-sample for the luma component and one eighth-sample for the chroma components. A 7-tap or 8-tap interpolation filter is used for interpolation of fractional-sample sample positions, i.e., ¼, ½ and ¾ of full sample locations in both horizontal and vertical directions can be addressed for luma.

The residuals are transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder comprises a decoding loop and thus decodes an encoded block to provide a reference for further predictions. The quantized transform coefficients are de-quantized (140) and inverse transformed (150) to decode residuals. A picture block is reconstructed by combining (155) the decoded residuals and the predicted sample block. An in-loop filter (165) is applied to the reconstructed picture, for example, to perform deblocking/SAO (Sample Adaptive Offset) filtering to reduce coding artifacts. The filtered picture may be stored in a reference picture buffer (180) and used as reference for other pictures.

In HEVC, SAO filtering may be activated or de-activated at video level, slice level and CTB level. Two SAO modes are specified: edge offset (EO) and band offset (BO). For EO, the sample classification is based on local directional structures in the picture to be filtered. For BO, the sample classification is based on sample values. The parameters for EO or BO may be explicitly coded or derived from the neighborhood. SAO can be applied to the luma and chroma components, where the SAO mode is the same for Cb and Cr components. The SAO parameters (i.e. the offsets, the SAO types EO, BO and inactivated, the class in case of EO and the band position in case of BO) are configured individually for each color component.

Figure 3:
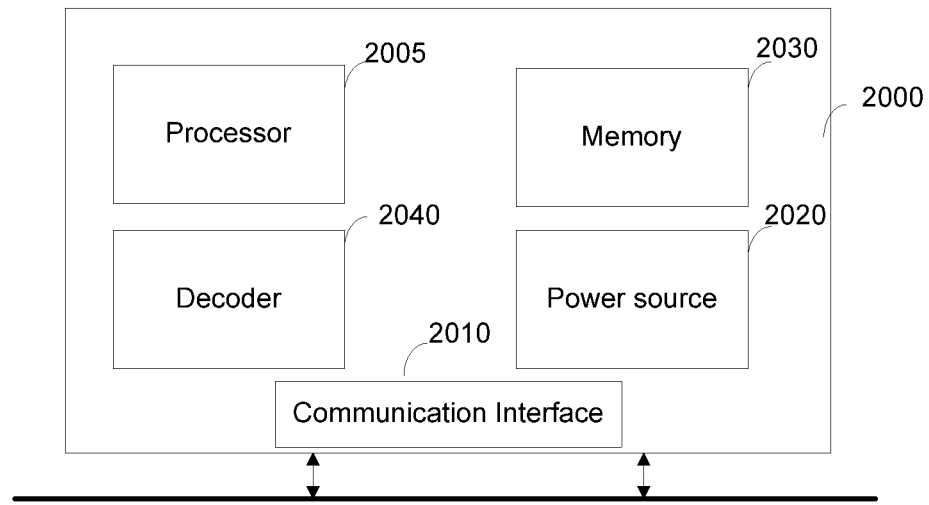
FIG. 3 represents an exemplary architecture of a receiver configured to decode a picture from a bitstream to obtain a decoded picture according to a specific and non-limiting embodiment.

FIG. 3 represents an exemplary architecture of a receiver 2000 configured to decode a picture from a bitstream to obtain a decoded picture according to a specific and non-limiting embodiment.

The receiver 2000 comprises one or more processor(s) 2005, which could comprise, for example, a CPU, a GPU and/or a DSP (English acronym of Digital Signal Processor), along with internal memory 2030 (e.g. RAM, ROM and/or EPROM). The receiver 2000 comprises one or more communication interface(s) 2010 (e.g. a keyboard, a mouse, a touchpad, a webcam), each adapted to display output information and/or allow a user to enter commands and/or data (e.g. the decoded picture); and a power source 2020 which may be external to the receiver 2000. The receiver 2000 may also comprise one or more network interface(s) (not shown). The decoder module 2040 represents the module that may be included in a device to perform the decoding functions. Additionally, the decoder module 2040 may be implemented as a separate element of the receiver 2000 or may be incorporated within processor(s) 2005 as a combination of hardware and software as known to those skilled in the art.

The bitstream may be obtained from a source. According to different embodiments, the source can be, but is not limited to:
   a local memory, e.g. a video memory, a RAM, a flash memory, a hard disk;
   a storage interface, e.g. an interface with a mass storage, a ROM, an optical disc or a magnetic support;
   a communication interface, e.g. a wireline interface (for example a bus interface, a wide area network interface, a local area network interface) or a wireless interface (such as a IEEE 802.11 interface or a Bluetooth interface); and
   an image capturing circuit (e.g. a sensor such as, for example, a CCD (or Charge-Coupled Device) or CMOS (or Complementary Metal-Oxide-Semiconductor)).

According to different embodiments, the decoded picture may be sent to a destination, e.g. a display device. As an example, the decoded picture is stored in a remote or in a local memory, e.g. a video memory or a RAM, a hard disk. In a variant, the decoded picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 2000 further comprises a computer program stored in the memory 2030. The computer program comprises instructions which, when executed by the receiver 2000, in particular by the processor 2005, enable the receiver to execute the decoding method described with reference to FIGS. 5B, 6B, 8B, 10B and 11B. According to a variant, the computer program is stored externally to the receiver 2000 on a non-transitory digital data support, e.g. on an external storage medium such as a HDD, CD-ROM, DVD, a read-only and/or DVD drive and/or a DVD Read/Write drive, all known in the art. The receiver 2000 thus comprises a mechanism to read the computer program. Further, the receiver 2000 could access one or more Universal Serial Bus (USB)-type storage devices (e.g., "memory sticks.") through corresponding USB ports (not shown).

According to exemplary and non-limiting embodiments, the receiver 2000 can be, but is not limited to:
   a mobile device;
   a communication device;
   a game device;
   a set top box;
   a TV set;
   a tablet (or tablet computer);
   a laptop;
   a video player, e.g. a Blu-ray player, a DVD player;
   a display; and
   a decoding chip or decoding device/apparatus.

Figure 4:
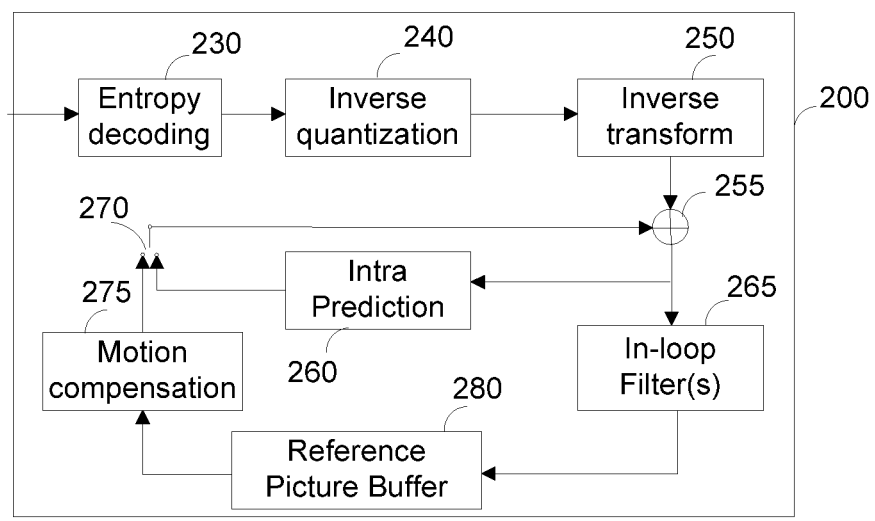
FIG. 4 illustrates a block diagram of an exemplary video decoder, e.g. an HEVC video decoder, adapted to execute the decoding method according to the present principles.

FIG. 4 illustrates a block diagram of an exemplary video decoder 200, e.g. an HEVC video decoder, adapted to execute the decoding method according to one embodiment of FIGS. 5B, 6B, 8B, 10B and 11B. The video decoder 200 is an example of a receiver 2000 or part of such a receiver 2000. In the exemplary decoder 200, a bitstream is decoded by the decoder elements as described below. Video decoder 200 generally performs a decoding pass reciprocal to the encoding pass as described in FIG. 2, which performs video decoding as part of encoding video data.

In particular, the input of the decoder includes a video bitstream, which may be generated by the video encoder 100. The bitstream is first entropy decoded (230) to obtain transform coefficients, motion vectors, and other coded information. The transform coefficients are de-quantized (240) and inverse transformed (250) to decode residuals. The decoded residuals are then combined (255) with a predicted sample block (also known as a predictor) to obtain a decoded/reconstructed picture block. The predicted sample block may be obtained (270) from intra prediction (260) or motion-compensated prediction (i.e., inter prediction) (275). As described above, AMVP and merge mode techniques may be used during motion compensation, which may use interpolation filters to calculate interpolated values for sub-integer samples of a reference block. An in-loop filter (265) is applied to the reconstructed picture. The in-loop filter may comprise a deblocking filter and a SAO filter. The filtered picture is stored at a reference picture buffer (280).

Figure 5A:
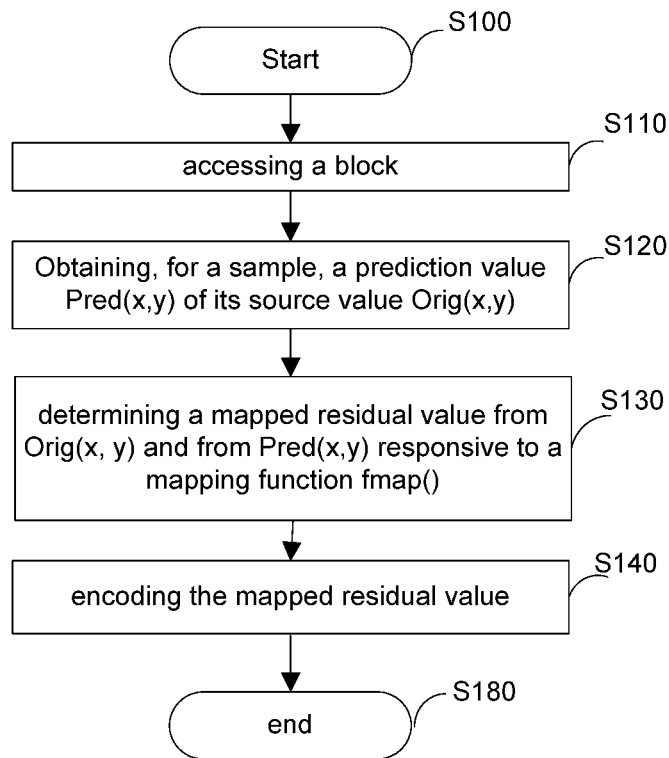
FIGS. 5A, 6A, 8A, 10A and 11A represent flowcharts of a method for encoding a picture block in a bitstream according to various embodiments.

FIG. 5A represents a flowchart of a method for encoding a picture block in a bitstream according to the present principles. The mapping is applied in the coding loop to obtain mapped residual samples at the pixel level. As opposed to the prior art, the input samples of the encoding method are not modified by the mapping. On the decoder side, the output samples from the decoder are not modified by an inverse mapping. The mapping may apply to one or several components of the picture. For instance, it may apply to the luma component only, or to the chroma components only, or to the luma and chroma components.

The method starts at step S100. At step S110, a transmitter 1000, e.g. such as the encoder 100, accesses a block of a picture slice. At step S120, the transmitter obtains, for at least one sample of the accessed block and for at least one component (e.g. for the luma), a prediction value Pred(x,y) of its source value Orig(x,y), where (x,y) are the spatial coordinates of the sample in the picture. The prediction value is obtained, i.e. usually determined, depending on the prediction mode (intra/inter mode) selected for the block.

At step S130, the transmitter determines a mapped residual value, for the sample, from the source value Orig (x,y) of the sample and from the prediction value Pred(x,y), responsive to a mapping function $f_{map}()$. The mapping function is defined or derived to obtain coding gains, that is, a reduction of the bit cost of the bitstream, i.e. the number of bits, for a given visual or objective quality of reconstruction, or an increase of visual or objective quality of reconstruction for a given bit cost. When a block, a picture or a sequence of pictures is encoded in a bitstream of a given size, i.e. a given number of bits, the quality of reconstruction at the receiver of the block, picture or sequence of pictures depends on this size. On the other hand, when a block, a picture, a sequence of pictures is encoded at a given quality of reconstruction, then the size of the bitstream depends on this quality of reconstruction.

In the most cases, the distortion that is representative of the quality of reconstruction is defined as the expected value of the square of the difference between input and output signal (i.e., the mean squared error). However, since most lossy compression techniques operate on data that will be perceived by human consumers (watching pictures and video) the distortion measure may preferably be modeled based on human perception and perhaps aesthetics.

Figure 7:
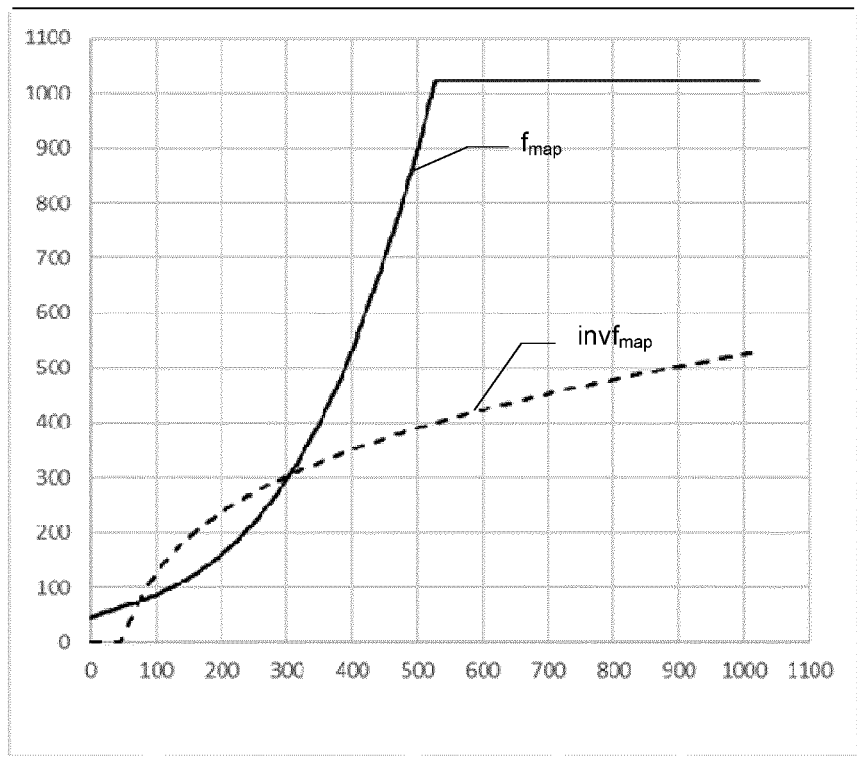
FIG. 7 depicts a mapping function $f_{map}$ and its inverse function $invf_{map}$.

For example, the mapping function can be derived by one of the following approaches:
  the mapping function is derived such that the amplitude of the residual value is increased more for large amplitude values of the component value than for small amplitude values of the component value as depicted on FIG. 7;
  a pre-defined encoder quantization adjustment table deltaQP or a quantization adjustment function dQP(Y), where Y is the video signal luma, may be derived or tuned to get improved perceptual or objective coding performance. From deltaQP or dQP(Y), a scaling function may be derived as follows: $sc(Y)=2^{\wedge}(-dQP(Y)/6)$, where ^ is the power operator. The scaling function may be used in the mapping function, which would correspond to a multiplication of the residual by the scaling value derived from the scaling function. In a variant, the mapping function may be derived by considering that this scaling function is the derivative function of the mapping function applied to the residual;
  a pre-encoder function Map(Y), where Y is luma video signal, or the derivative of Map(Y) which is a scaling function, may be used as the mapping function $f_{map}()$ to map the residual in step S130. The pre-encoder function Map(Y) is derived so that the original samples of the signal, once mapped by this pre-encoder function Map(Y), are better distributed in the overall codewords range (for instance, thanks to a histogram equalization).

In addition to the three approaches mentioned above, other approaches can be used to derive the mapping function provided that mapping the residual value improve the compression performance.

The steps S110 and S120 may be repeated for each sample of the accessed block in order to obtain a block of mapped residual values.

At step S140, the transmitter encodes the mapped residual value. Encoding the mapped residual value usually but not necessarily comprises transforming residuals into transform coefficients, quantizing the coefficients with a quantization step size QP to obtain a quantized coefficients and entropy coding the quantized coefficients in the bitstream.

The method ends at step S180.

Figure 5B:
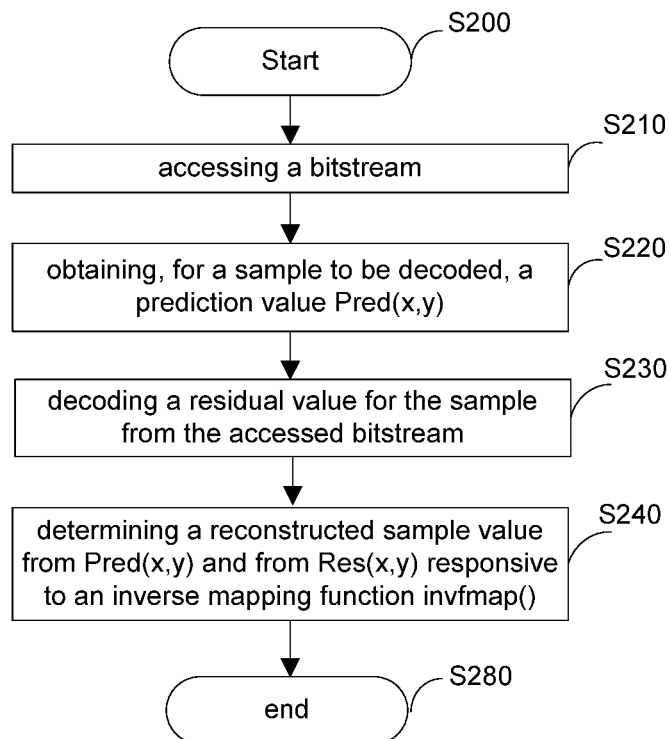
FIGS. 5B, 6B, 8B, 10B and 11B represent flowcharts of a method for decoding a picture block from a bitstream according to various embodiments.

FIG. 5B represents a flowchart of a method for decoding a picture block in a bitstream that corresponding to the encoding method of FIG. 5A.

The method starts at step S200. At step D210, a receiver 2000 such as the decoder 200 accesses a bitstream.

At step S220, the receiver obtains, for at least one component (e.g. for the luma), a prediction value Pred(x,y) for at least one sample, where (x,y) are the spatial coordinates of the sample in the picture. The prediction value is obtained depending on the prediction mode (intra/inter mode) selected for the block.

At step S230, the receiver decodes a residual value Res(x,y) for the sample to be decoded. The residual value Res(x,y) is a decoded version of the mapped residual value encoded at step S140 of FIG. 5A. Decoding usually but not necessarily comprises entropy decoding a portion of the bitstream representative of a block to obtain a block of transform coefficients, de-quantizing and inverse transforming the block of transform coefficients to obtain a block of residuals.

At step S240, the transmitter determines, for the sample, a reconstructed sample value from the decoded residual value and from the prediction value responsive to a mapping function $invf_{map}()$ that is the inverse of the mapping function $f_{map}(\ )$ used by the encoding method at step S130. The steps S220 to S240 may be repeated for each sample of the accessed block.

The method ends at step S280.

Figure 6A:
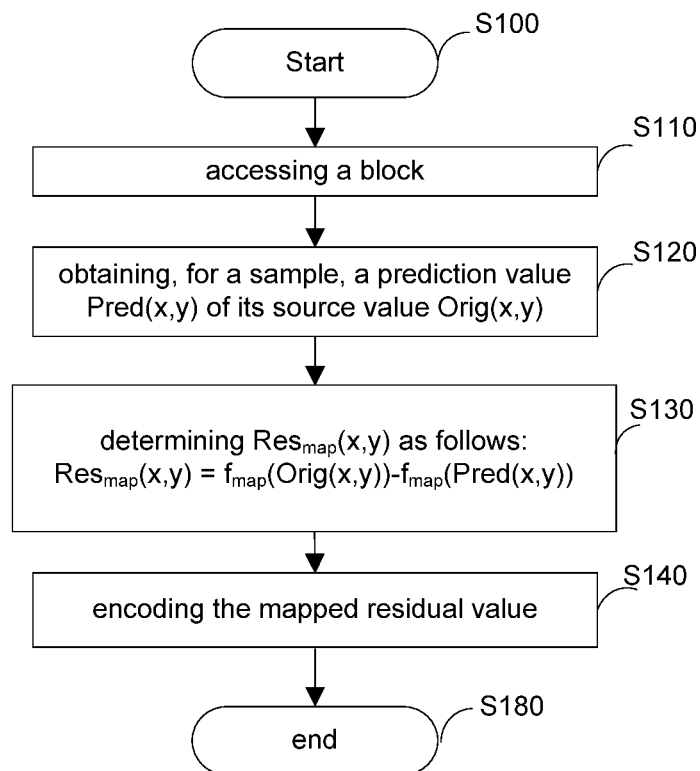

FIG. 6A represents a flowchart of a method for encoding a picture block in a bitstream according to a first specific and non-limiting embodiment.

The method starts at step S100. At step S110, a transmitter 1000, e.g. such as the encoder 100, accesses a block of a picture slice. At step S120, the transmitter obtains, for at least one component (e.g. for the luma), a prediction value Pred(x,y) of a value Orig(x,y) for at least one sample of the accessed block, where (x,y) are the spatial coordinates of the sample in the picture. The prediction value is obtained depending on the prediction mode (intra/inter mode) selected for the block.

At step S130, the transmitter determines a mapped residual value, for the sample, from the source value Orig (x,y) of the sample and from the prediction value Pred(x,y) responsive to a mapping function $f_{map}(\ )$. The mapping function is defined or derived to obtain coding gains, that is, a reduction of the bitrate for a given visual or objective quality, or an increase of visual or objective quality for a given bitrate. The mapping function may be derived by one of the methods disclosed with reference to FIG. 5A. The steps S110 to S130 may be repeated for each sample of the accessed block in order to obtain a block of mapped residual values. In the first embodiment, the mapped residual denoted $Res_{map}(x,y)$ is equal to $f_{map}(Orig(x,y))-f_{map}(Pred(x,y))$.

At step S140, the transmitter encodes the mapped residual value. Encoding the mapped residual value usually but not necessarily comprises transforming residuals into transform coefficients, quantizing the coefficients with a quantization step size QP to obtain a quantized coefficients and entropy coding the quantized coefficients in the bitstream.

The method ends at step S180.

Figure 6B:
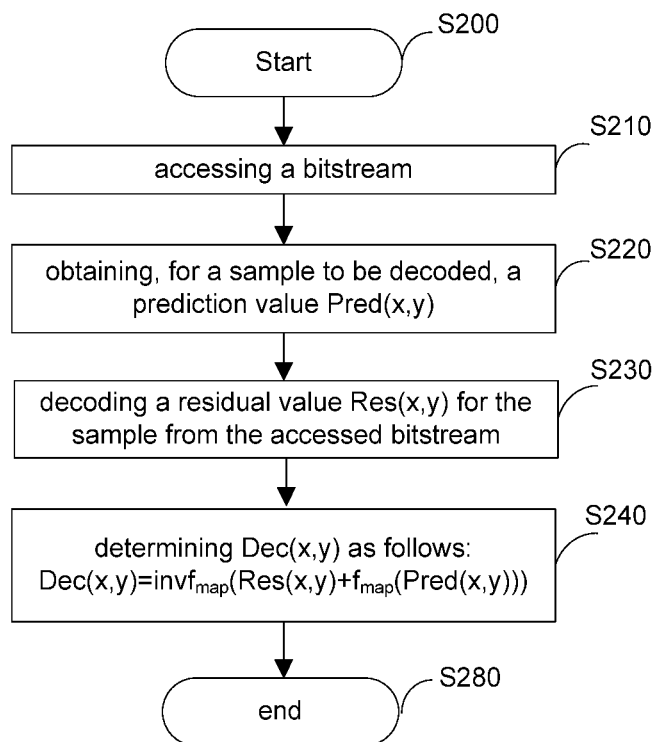

FIG. 6B represents a flowchart of a method for decoding a picture block in a bitstream according to a first specific and non-limiting embodiment corresponding to the embodiment of the encoding method according to FIG. 6A.

The method starts at step S200. At step S210, a receiver 2000 such as the decoder 200 accesses a bitstream.

At step S220, the receiver obtains, for at least one component (e.g. for the luma), a prediction value Pred(x,y) for at least one sample, where (x,y) are the spatial coordinates of the sample in the picture. The prediction value is obtained depending on the prediction mode (intra/inter mode) selected for the block.

At step S230, the receiver decodes a residual value Res(x,y) for the sample to be decoded. The residual value Res(x,y) is a decoded version of the mapped residual value encoded at step S140 of FIG. 6A. Decoding usually but not necessarily comprises entropy decoding a portion of the bitstream representative of a block to obtain a block of transform coefficients, de-quantizing and inverse transforming the block of transform coefficients to obtain a block of residuals.

At step S240, the transmitter determines, for the sample, a reconstructed sample value Dec(x,y) from the decoded residual value Res(x,y) and from the prediction value Pred (x,y) responsive to both the mapping function $f_{map}(\ )$ used by the encoding method at step S130 and its inverse $invf_{map}(\ )$. The steps S220 to S240 may be repeated for each sample of the accessed block to obtain a reconstructed block. In the first embodiment, the reconstructed sample value denoted Dec(x,y) is equal to $invf_{map}(Res(x,y)+f_{map}(Pred(x,y)))$.

The method ends at step S280.

Figure 8A:
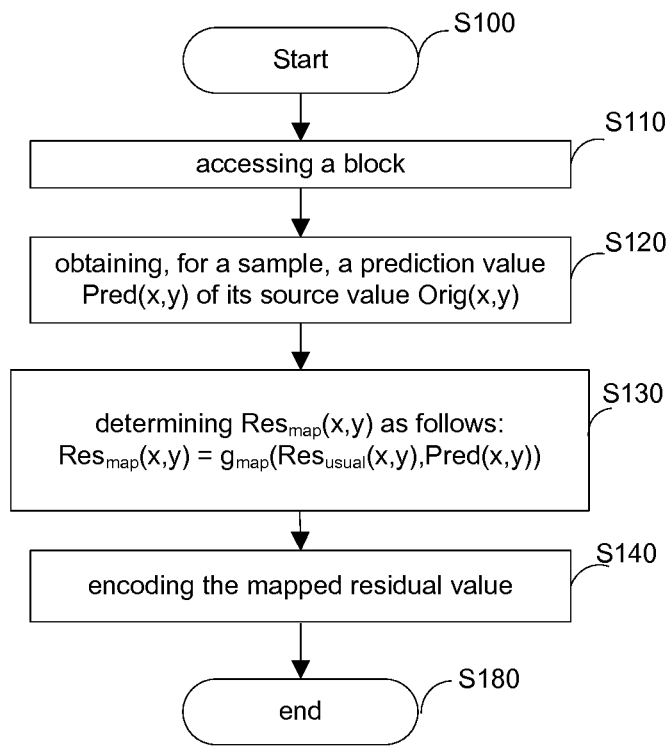

FIG. 8A represents a flowchart of a method for encoding a picture block in a bitstream according to a second specific and non-limiting embodiment.

The method starts at step S100. At step S110, a transmitter 1000, e.g. such as the encoder 100, accesses a block of a picture slice. At step S120, the transmitter obtains, for at least one component (e.g. for the luma), a prediction value Pred(x,y) of a value Orig(x,y) for at least one sample of the accessed block, where (x,y) are the spatial coordinates of the sample in the picture. The prediction value is obtained depending on the prediction mode (intra/inter mode) selected for the block.

At step S130, the transmitter determines a mapped residual value, for the sample, from the source value Orig (x,y) of the sample and from the prediction value Pred(x,y), responsive to a mapping function $g_{map}(\ )$. The mapping function is defined or derived to obtain coding gains, that is, a reduction of the bitrate for a given visual or objective quality, or an increase of visual or objective quality for a given bitrate. The mapping function may be derived by one of the methods disclosed with reference to FIG. 5A. The steps S110 to S130 may be repeated for each sample of the accessed block in order to obtain a block of mapped residual values. In the second embodiment, the mapped residual denoted $Res_{map}(x,y)$ is equal to $g_{map}(Res_{usual}(x,y), Pred(x,y))$, where $Res_{usual}(x,y)=Orig(x,y)-Pred(x,y)$.

One simple version of the functions $g_{map}(p, v)$ and $invg_{map}(p, v)$ may be derived from the first embodiment. For a prediction value p and a sample residual value v, $g_{map}(p, v)$ and $invg_{map}(p, v)$ may be constructed as follows.

In the first embodiment, $Res_{remap}(x,y)=f_{map}(Orig(x,y))-f_{map}(Pred(x,y))$ If the signals Orig(x,y) and Pred(x,y) are close, which is expected when the prediction performs well, then we can consider than $Orig(x,y)=Pred(x,y)+\varepsilon$, with $\varepsilon$ being of very small amplitude. Considering the definition of the derivative of a function, we can consider that $$f_{map}(Orig(x,y))=f_{map}(Pred(x,y)+\varepsilon)\approx f_{map}(Pred(x,y))+\varepsilon * f'_{map}(Pred(x,y))$$

where $f_{map}$ corresponds to a 1D function, for instance as defined in embodiment 1, and $f'_{map}$ is the derivative of the function $f_{map}$.

Then $Res_{map}(x,y)=f_{map}(Orig(x,y))-f_{map}(Pred(x,y))\approx \varepsilon * f'_{map}(Pred(x,y))$.

By definition, $\varepsilon=Orig(x,y)-Pred(x,y)$ is the usual prediction residual $Res_{usual}(x,y)$.

So we can use the following functions $g_{map}(p, v)$ and $invg_{map}(p, v)$:

$$g_{map}(p,v)=f'_{map}(p)*v$$

$$invg_{map}(p,v)=(1/f'_{map}(p))*v$$

At the encoder, the mapped residual is derived as:

$$Res_{map}(x,y)=f'_{map}(Pred(x,y))*Res_{usual}(x,y) \qquad (eq. 1)$$

At the decoder, the reconstructed signal is derived as:

$$Dec(x,y)=Pred(x,y)+1/f'_{map}(Pred(x,y))*Res_{dec}(x,y)) \qquad (eq. 2)$$

This means that the mapping is a simple scaling of the usual residual by a scaling factor that depends on the prediction value. Possibly at encoder, the scaling factor depends on the original value, and not on the prediction value. However, by doing this, a mismatch between the encoder and the decoder is produced. A filtered version of the prediction can also be used, for instance to reduce the impact of the quantization errors, by using a smoothing filter.

For instance, instead of using Pred(x,y) in equations 1 and 2, the filtered version (Pred(x−1,y)/4+Pred(x,y)/2+Pred(x+1,y))/4) can be used.

Figure 9:
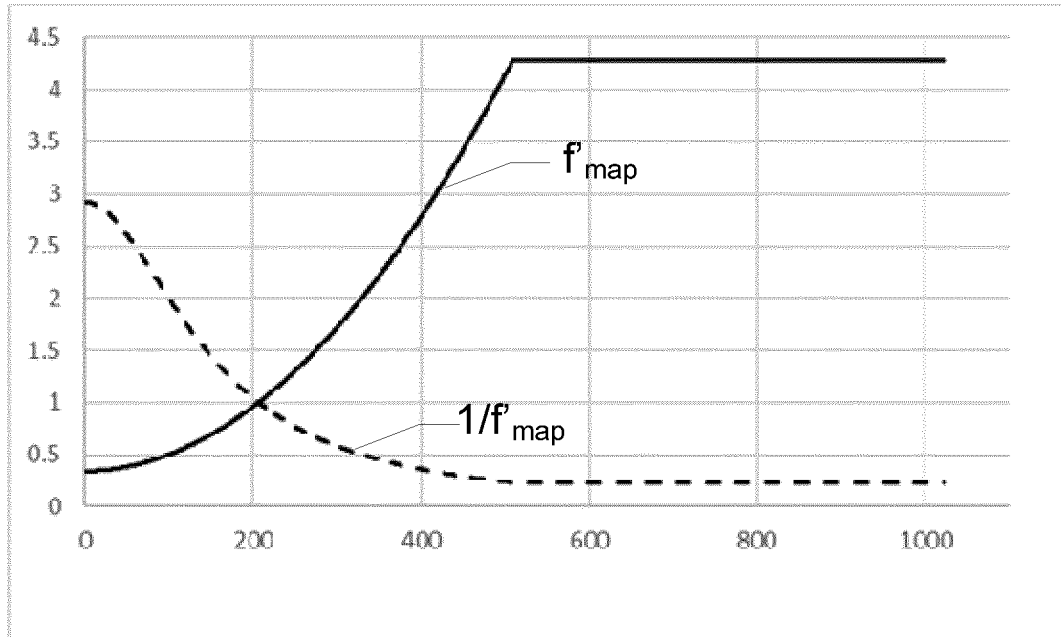
FIG. 9 depicts a derivative $f'_{map}$ of a mapping function $f_{map}$ and the function $1/f'_{map}$.

FIG. 9 gives an example of the functions $f_{map}$ and $(1/f_{map})$.

At step S140, the transmitter encodes the mapped residual value. Encoding the mapped residual value usually but not necessarily comprises transforming residuals into transform coefficients, quantizing the coefficients with a quantization step size QP to obtain a quantized coefficients and entropy coding the quantized coefficients in the bitstream.

The method ends at step S180.

Figure 8B:
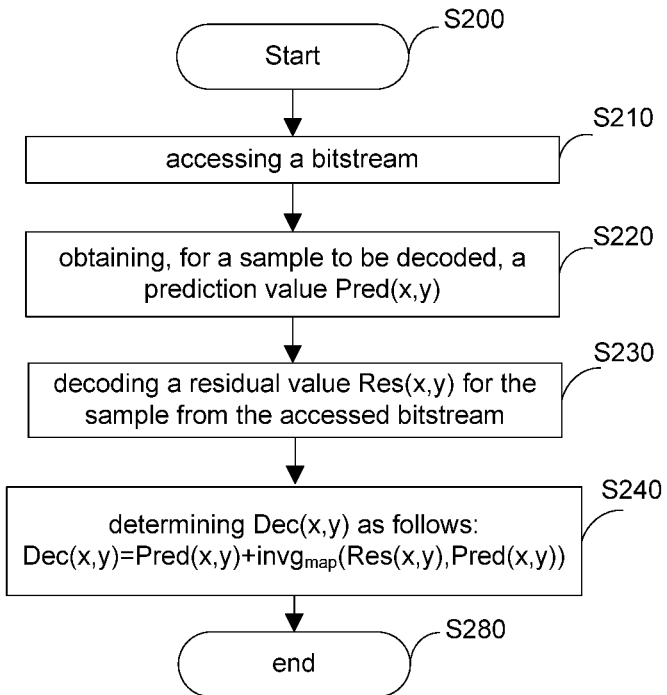

FIG. 8B represents a flowchart of a method for decoding a picture block in a bitstream that corresponds to the encoding method disclosed with respect to FIG. 8A.

The method starts at step S200. At step S210, a receiver 2000 such as the decoder 200 accesses a bitstream.

At step S220, the receiver obtains, for at least one component (e.g. for the luma), a prediction value Pred(x,y) for at least one sample, where (x,y) are the spatial coordinates of the sample in the picture. The prediction value is obtained depending on the prediction mode (intra/inter mode) selected for the block.

At step S230, the receiver decodes a residual value Res(x,y) for the sample to be decoded. The residual value Res(x,y) is a decoded version of the mapped residual value encoded at step S140 of FIG. 8A. Decoding usually but not necessarily comprises entropy decoding a portion of the bitstream representative of a block to obtain a block of transform coefficients, de-quantizing and inverse transforming the block of transform coefficients to obtain a block of residuals.

At step S240, the transmitter determines, for the sample, a reconstructed sample value Dec(x,y) from the decoded residual value Res(x,y) and from the prediction value Pred(x,y) responsive to a mapping function $invg_{map}()$ that is the inverse of the mapping function $g_{map}()$ used by the encoding method at step S130 in FIG. 8A. The steps S220 to S240 may be repeated for each sample of the accessed block to obtain a reconstructed block. In the second embodiment, the reconstructed sample value denoted Dec(x,y) is equal to Pred(x,y)+$invg_{map}$(Res(x,y), Pred(x,y)).

This embodiment advantageously allows, at the decoder, to map the prediction residual using $invg_{map}$ function in one single step, while the first embodiment requires to apply both $f_{map}$ function and $invf_{map}$.

The method ends at step S280.

Figure 10A:
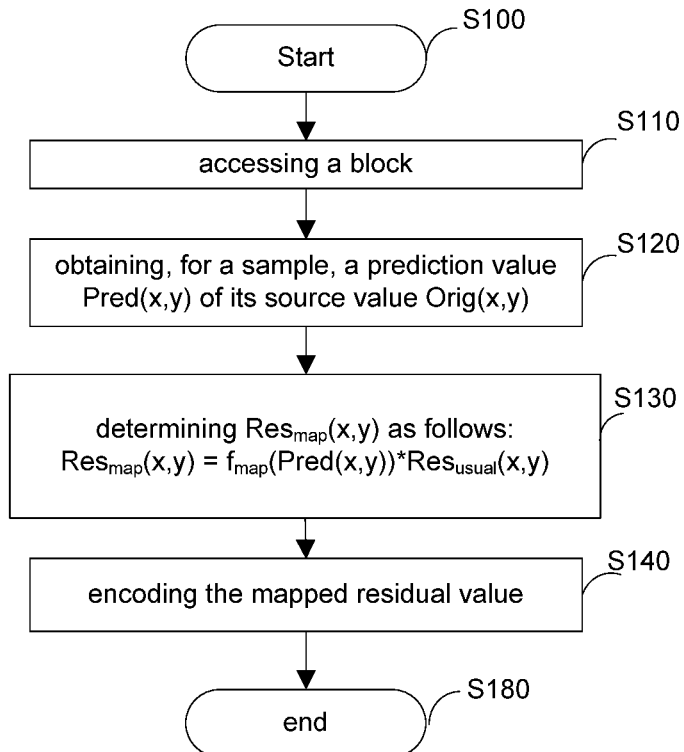

FIG. 10A represents a flowchart of a method for encoding a picture block in a bitstream according to a third specific and non-limiting embodiment. This embodiment is a generalization of the second embodiment. The functions $f_{map}$ and $invf_{map}()$ are scaling functions, whose scaling factor depends on value of the prediction signal (or, as mentioned before, of a filtered version of the prediction signal).

The method starts at step S100. At step S110, a transmitter 1000, e.g. such as the encoder 100, accesses a block of a picture slice. At step S120, the transmitter obtains, for at least one component (e.g. for the luma), a prediction value Pred(x,y) of a value Orig(x,y) for at least one sample of the accessed block, where (x,y) are the spatial coordinates of the sample in the picture. The prediction value is obtained depending on the prediction mode (intra/inter mode) selected for the block.

At step S130, the transmitter determines a mapped residual value, for the sample, from the source value Orig(x,y) of the sample and from the prediction value Pred(x,y) responsive to a mapping function $f_{map}()$. The mapping function is defined or derived to obtain coding gains, that is, a reduction of the bitrate for a given visual or objective quality, or an increase of visual or objective quality for a given bitrate. The mapping function may be derived by one of the methods disclosed with reference to FIG. 5A. The steps S110 to S130 may be repeated for each sample of the accessed block in order to obtain a block of mapped residual values. In the second embodiment, the mapped residual denoted $Res_{map}(x,y)$ is equal to $f_{map}(Pred(x,y))*Res_{usual}(x,y)$, where $Res_{usual}(x,y)=Orig(x,y)-Pred(x,y)$. This is a generalized version of (eq. 1) and (eq. 2). In a variant, the original value Orig(x,y) may be used instead of Pred(x,y). In this case, $Res_{map}(x,y)$ is equal to $f_{map}(Orig(x,y))*Res_{usual}(x,y)$. In another variant, a combination Comb(x,y) of Orig(x,y) and Pred(x,y), for instance the average of these two values, may be used. In this latter case, $Res_{map}(x,y)$ is equal to $f_{map}(Comb(x,y))*Res_{usual}(x,y)$.

At step S140, the transmitter encodes the mapped residual value. Encoding the mapped residual value usually but not necessarily comprises transforming residuals into transform coefficients, quantizing the coefficients with a quantization step size QP to obtain a quantized coefficients and entropy coding the quantized coefficients in the bitstream.

The method ends at step S180.

Figure 10B:
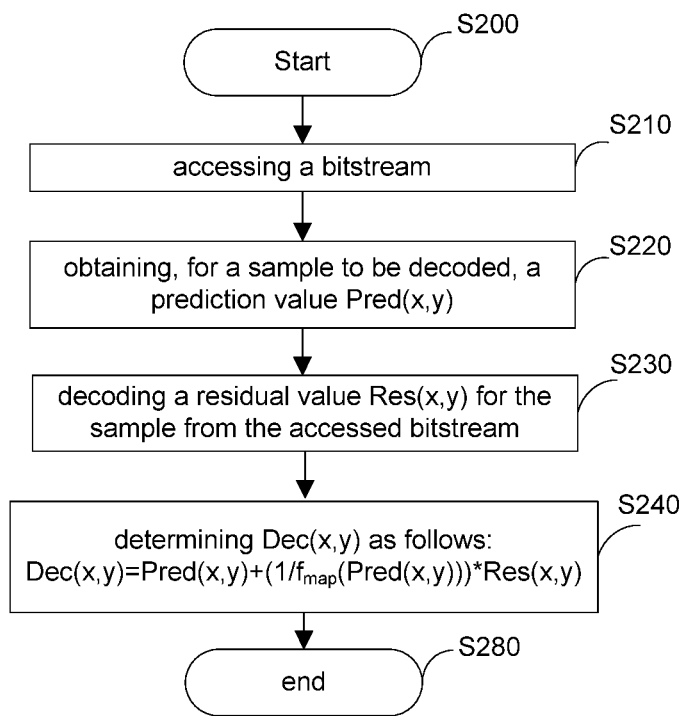

FIG. 10B represents a flowchart of a method for decoding a picture block from a bitstream that corresponds to the encoding method disclosed with respect to FIG. 10A.

The method starts at step S200. At step S210, a receiver 2000 such as the decoder 200 accesses a bitstream.

At step S220, the receiver obtains, for at least one component (e.g. for the luma), a prediction value Pred(x,y) for at least one sample, where (x,y) are the spatial coordinates of the sample in the picture. The prediction value is obtained depending on the prediction mode (intra/inter mode) selected for the block.

At step S230, the receiver decodes a residual value Res(x,y) for the sample to be decoded. The residual value Res(x,y) is a decoded version of the mapped residual value encoded at step S140 of FIG. 10A. Decoding usually but not necessarily comprises entropy decoding a portion of the bitstream representative of a block to obtain a block of transform coefficients, de-quantizing and inverse transforming the block of transform coefficients to obtain a block of residuals.

At step S240, the receiver determines, for the sample, a reconstructed sample value Dec(x,y) from the decoded residual value Res(x,y) and from the prediction value Pred(x,y) responsive to a mapping function $invf_{map}()=1/f_{map}()$ used by the encoding method at step S130. The steps S220 to S240 may be repeated for each sample of the accessed block to obtain a reconstructed block. In the second embodiment, the reconstructed sample value denoted Dec(x,y) is equal to Pred(x,y)+$(1/f_{map}(Pred(x,y)))*Res(x,y)$.

This embodiment advantageously allows, at the decoder, to perform the inverse mapping by using a simple multiplication, which brings a limited added complexity and enables to perform an accurate mapping, where rounding operations can be applied at the very end of the process (when computing Dec(x,y)).

The method ends at step S280.

Figure 11A:
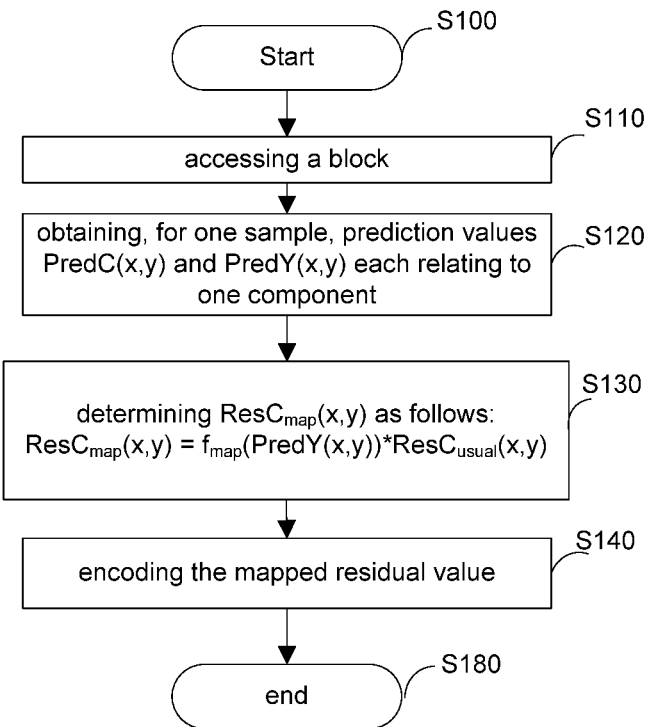

FIG. 11A represents a flowchart of a method for encoding a picture block in a bitstream according to a fourth specific and non-limiting embodiment. In this embodiment, the mapping is a cross-component scaling. For instance, the mapping applies to a chroma component C, C being U (or Cb) or V (or Cr), depending on the co-located luma component Y (or of a filtered version of it). When luma and chroma pictures are not of same resolution (for instance for 4:2:0 chroma format), the luma value can be taken after resampling, or as one of the sample values of the luma picture to which the chroma sample is associated. For instance, in case of 4:2:0 signal, for a position (x,y) in the picture, the luma value at position (2*x, 2*y) can be considered.

The method starts at step S100. At step S110, a transmitter 1000, e.g. such as the encoder 100, accesses a block of a picture slice. At step S120, the transmitter obtains, for at least one component (e.g. for the chroma C), a prediction value PredC(x,y) of a source value OrigC(x,y) for at least one sample of the accessed block, where (x,y) are the spatial coordinates of the sample in the picture and further obtains for at least another component (e.g. for the luma Y), a prediction value PredY(x,y) of a source value OrigY(x,y) for the same sample. The prediction values are obtained depending on the prediction mode (intra/inter mode) selected for the block.

At step S130, the transmitter determines a mapped residual value, for the sample, from the source value OrigC (x,y) of the sample and from the prediction values PredC (x,y) and PredY(x,y) responsive to a mapping function $f_{map}$( ). The mapping function is defined or derived to obtain coding gains, that is, a reduction of the bitrate for a given visual or objective quality, or an increase of visual or objective quality for a given bitrate. The mapping function may be derived by one of the methods disclosed with reference to FIG. 5A. The steps S110 to S130 may be repeated for each sample of the accessed block in order to obtain a block of mapped residual values. In the fourth embodiment, the mapped residual denoted $ResC_{map}(x,y)$ is equal to $f_{map}(PredY(x,y))*ResC_{usual}(x,y)$, where $ResC_{usual}(x,y)=OrigC(x,y)-PredC(x,y)$, where OrigC (x,y) is the value of the source sample of chroma component C (to be coded) at position (x,y) in the picture, PredC (x,y) is the value of the prediction sample of chroma component C, and $ResC_{usual}(x,y)$ is the value of the prediction residual sample of chroma component C.

At step S140, the transmitter encodes the mapped residual value. Encoding the mapped residual value usually but not necessarily comprises transforming residuals into transform coefficients, quantizing the coefficients with a quantization step size QP to obtain a quantized coefficients and entropy coding the quantized coefficients in the bitstream.

The method ends at step S180.

Figure 11B:
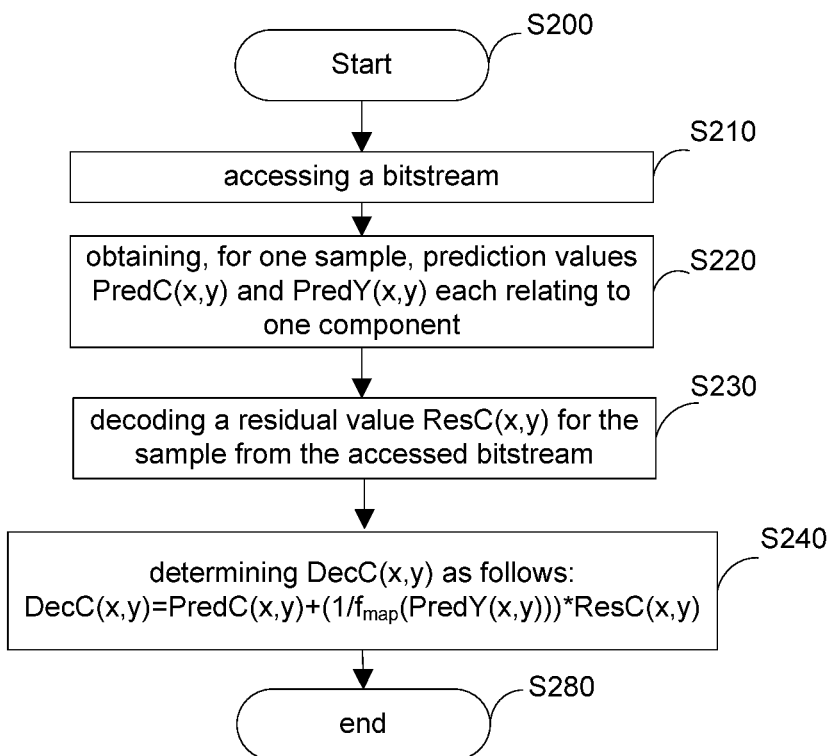

FIG. 11B represents a flowchart of a method for decoding a picture block from a bitstream that corresponds to the encoding method disclosed with respect to FIG. 11A.

The method starts at step S200. At step S210, a receiver 2000 such as the decoder 200 accesses a bitstream.

At step S220, the receiver obtains, for at least one component (e.g. for the chroma C), a prediction value PredC(x,y) of a source value OrigC(x,y) for at least one sample of the accessed block, where (x,y) are the spatial coordinates of the sample in the picture and further obtains for at least another component (e.g. for the luma Y), a prediction value PredY(x,y) of a source value OrigY(x,y) for the same sample (possibly with downsampling when the luma and chroma pictures do not have same resolution). The prediction values are obtained depending on the prediction mode (intra/inter mode) selected for the block.

At step S230, the receiver decodes a residual value ResC(x,y) for the sample to be decoded. The residual value ResC(x,y) is a decoded version of the mapped residual value encoded at step S140 of FIG. 11A. Decoding usually but not necessarily comprises entropy decoding a portion of the bitstream representative of a block to obtain a block of transform coefficients, de-quantizing and inverse transforming the block of transform coefficients to obtain a block of residuals.

At step S240, the receiver determines, for the sample, a reconstructed sample value DecC(x,y) from the decoded residual value ResC(x,y) and from the prediction values PredC(x,y) and PredY(x,y) responsive to a mapping function $1/f_{map}$( ) where $f_{map}$( ) is the mapping function used by the encoding method at step S130. The steps S220 to S240 may be repeated for each sample of the accessed block to obtain a reconstructed chroma block. In the fourth embodiment, the reconstructed sample value denoted DecC(x,y) is equal to $PredC(x,y)+(1/f_{map}(PredY(x,y)))*ResC(x,y)$.

This embodiment advantageously allows, at the decoder, to scale the chroma component depending on the luma component, which in general results in improved visual quality thanks to a fine control of the scaling of chroma for the different luma intervals.

The method ends at step S280.

The third and fourth embodiments disclosed with respect to FIGS. 10A, 10B, 11A and 11B may be advantageously implemented in a fixed-point manner.

Let $ResC_{usual}$ be the prediction residual at position (x,y) to map, by the scaling factor scal, derived for instance in case of cross-component scaling from the value of $f_{map}$ at the value PredY (co-located value of the prediction luma used as cross-component): $scal=f_{map}(PredY)$.

What is used at decoder (and possibly coded in the bitstream, as it will be explained below), is invScal=round (2^B÷scal)

where

A ^ is the power operator, round(x) is the nearest integer value of x,

B is the bitDepth chosen to quantize the scaling factor (typically, B=8 or 10 bits)

The mapping of a value $ResC_{usual}$ into the mapped value $ResC_{map}$ is applied as follows:

$$ResC_{map}=(ResC_{usual}*2^B+sign(ResC_{usual})*(invScal/2))/invScal \quad (eq.\ 3)$$

Where $ResC_{usual}(x,y)=OrigC(x,y)-PredC(x,y)$, and sign(x) equals 1 when x>=0, −1 otherwise.

All parameters in this equation are integer, and the division "/" is also applied in integer (while the division ÷ is a floating-point division). The mapped value $ResC_{map}$ is then encoded.

On the decoder side, the encoded mapped value $ResC_{map}$ is decoded into a value $ResC_{map\_dec}$. The inverse mapping of the decoded value $ResC_{map\_dec}$ into the inverse mapped value $ResC_{invmap}$ is applied as follows:

$$ResC_{invmap}=(ResC_{map\_dec}*invScal+sign(ResC_{map\_dec})*2^{(B-1)})/2^B$$

$$(ResCmap\_dec*invScal+sign(ResCmap\_dec)*2(B-1))/2B \quad (eq.\ 4)$$

Which is equivalent to:

$$ResC_{invmap}=(ResC_{map\_dec}*invScal+sign(ResC_{map\_dec})*2^{(B-1)})>>B \quad (eq.\ 5)$$

Reconstructed value DecC is then derived from prediction value PredC and $ResC_{invmap}$ at location (x,y) as $$DecC=PredC+ResC_{invmap} \quad (eq.\ 6)$$

These operations can also be directly combined, to avoid using the sign operator. Equations (eq.5) and (eq.6) are combined into (eq.7).

$$DecC = (PredC * 2^B + ResC_{map\_dec} * invScal + 2^{(B-1)}) >> B \quad \text{(eq. 7)}$$

In HEVC, the quantization is tuned using a Quantization Parameter QP. From the QP, a quantization step, Qstep0 is derived and can be approximated as (K*2^(QP/6)) where K is a fixed parameter.

When a local QP correction, dQP, is used, the actual quantization step, Qstep1, can be approximated as (K*2^((QP+dQP)/6)), that is (Qstep0*2^(dQP/6)). The signal is divided by the quantization step.

This means that, for a given dQP, the corresponding scaling, derived from the inverse of the quantization step, applied to the signal in the quantization corresponds to 2^(-dQP/6).

For instance, the following correspondence can be established for the dQP table.

| Y range | dQP | scaling |
| --- | --- | --- |
| y = 0 to 116 | 0 | 1 |
| y = 117 to 149 | −1 | 1.12 |
| y = 150 to 183 | −2 | 1.26 |
| y = 184 to 216 | −3 | 1.41 |
| y = 217 to 249 | −4 | 1.59 |
| y = 250 to 283 | −5 | 1.78 |
| y = 284 to 316 | −6 | 2 |
| y = 317 to 349 | −7 | 2.24 |
| y = 350 to 383 | −8 | 2.52 |
| y = 384 to 416 | −9 | 2.83 |
| y = 417 to 449 | −10 | 3.17 |
| y = 450 to 483 | −11 | 3.56 |
| y = 484 to 1023 | −12 | 4 |

The scaling may be used for instance in the scaling solution described in the third embodiment. The scaling may also be used to derive a mapping function as used in the first and second embodiments. Indeed, this scaling corresponds to the derivative of the mapping function. Therefore, the mapping function may be modeled as a piece-wise linear function where each piece has a slope equal to the scaling corresponding to this piece.

If the dQP table is defined as a set of intervals $[Y_i, Y_{i+1}-1]$ with dQP value $dQP_i$ associated with each interval, for i=0 to n, n being an integer, the mapping function may be defined as follows.

Let i be the index of the interval containing Y (Y is in $[Y_i, Y_{i+1}-1]$).

$$f_{map}(Y) = f_{map}(Y_i) + 2^{(-dQP_i/6)} * (Y - Y_i)$$

Figure 12:
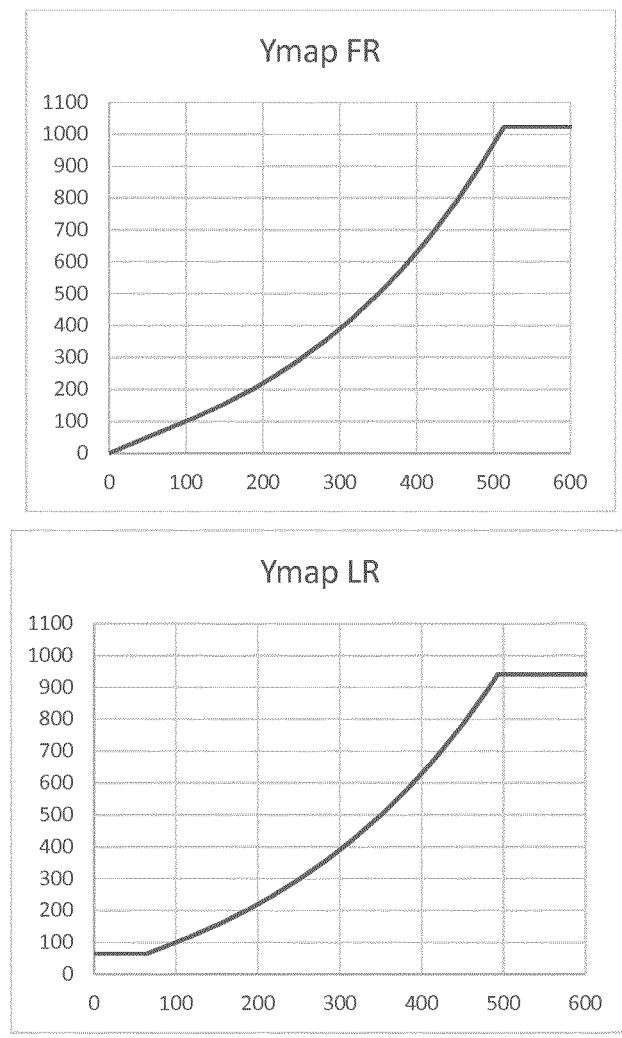
FIG. 12 shows mapping functions, in full or limited range, built from a dQP table.

This gives the functions shown in the FIG. 12, for Full Range (FR) or Limited Range (LR) signal representations, for the specific dQP table above.

The functions $f_{map}$ or $g_{map}$ or their inverse functions $invf_{map}$ or $invg_{map}$ may be either explicitly defined in decoder (and therefore in the decoder specification), or signaled in the bitstream.

The functions $f_{map}$, $invf_{map}$, $g_{map}$ or $invg_{map}$ may be implemented in the shape of:
  look-up-tables,
  piece-wise scalar functions (PWS),
  piece-wise linear functions (PWL),
  piece-wise polynomial functions (PWP).

They may be coded in SEI message, in Sequence Parameter Sets (SPS), Picture Parameter Sets (PPS), in slice header, in Coding Tree Unit (CTU) syntax, per Tile, or in new structure such as Adaptation Picture Sets (APS).

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding comprising:
    obtaining a chroma prediction value of a chroma source value of a sample of a block of a picture;
    obtaining a value representative of a luma prediction value of a luma source value of the sample;
    determining a mapped chroma residual value from the chroma source value and from the value representative of the luma prediction value using a mapping function; and
    encoding the mapped chroma residual value into a bitstream;
    wherein determining the mapped chroma residual value comprises:
        determining a chroma residual value as a difference between the chroma source value and the chroma prediction value; and
        mapping the chroma residual value with the mapping function to obtain a mapped chroma residual value, wherein the mapping comprises multiplying the chroma residual value by a scaling factor depending on the value representative of the luma prediction value.

2. The method of claim 1, further comprising:
    obtaining the luma prediction value;
    determining a mapped luma residual value from the luma source value and from the luma prediction value using a mapping function; and
    encoding the mapped luma residual value into a bitstream;
    wherein determining the mapped luma residual value comprises:
        mapping the luma prediction value with the mapping function to obtain a mapped luma prediction value;
        mapping the luma source value with the mapping function to obtain a mapped luma source value; and
        determining the mapped luma residual value as a subtraction of the mapped luma prediction value and the mapped luma source value.

3. A method of decoding comprising:
    obtaining a chroma prediction value of a chroma source value of a sample of a block of a picture;
    obtaining a value representative of a luma prediction value of a luma source value of the sample;
    decoding a chroma residual value for the sample; and
    determining a reconstructed chroma value for the sample from the decoded chroma residual value and from the chroma prediction value using a mapping function;
    wherein determining the reconstructed chroma value comprises:
        mapping the chroma residual value to obtain a mapped chroma residual value, wherein the mapping comprises multiplying the chroma residual value by a scaling factor depending on the value representative of the luma prediction value; and
        obtaining the reconstructed chroma value by adding the mapped chroma residual value to the chroma prediction value.

4. The method of claim 3, further comprising:
    obtaining the luma prediction value;
    decoding a luma residual value for the sample; and
    determining a reconstructed luma value for the sample from the decoded luma residual value and from the luma prediction value using both a mapping function and an inverse mapping function that is the inverse of the mapping function;
    wherein determining the reconstructed luma value comprises:
        mapping the luma prediction value with the mapping function to obtain a mapped luma prediction value;
        obtaining an intermediate value representative of a sum of the mapped luma prediction value and the luma residual value; and
        obtaining the reconstructed luma value by mapping the intermediate value with the inverse mapping function.

5. An encoding device comprising at least one processor configured to perform:
    obtaining a chroma prediction value of a chroma source value of a sample of a block of a picture;
    obtaining a value representative of a luma prediction value of a luma source value of the sample;
    determining a mapped chroma residual value from the chroma source value and from the value representative of the luma prediction value using a mapping function; and
    encoding the mapped chroma residual value into a bitstream;
    wherein determining the mapped chroma residual value comprises:
        determining a chroma residual value as a difference between the chroma source value and the chroma prediction value; and
        mapping the chroma residual value with the mapping function to obtain a mapped chroma residual value, wherein the mapping comprises multiplying the chroma residual value by a scaling factor depending on the value representative of the luma prediction value.

6. The encoding device of claim 5, wherein the at least one processor is further configured to perform:
    obtaining the luma prediction value;
    determining a mapped luma residual value from the luma source value and from the luma prediction value using a mapping function; and
    encoding the mapped luma residual value into a bitstream;
    wherein determining the mapped luma residual value comprises:
        mapping the luma prediction value with the mapping function to obtain a mapped luma prediction value;
        mapping the luma source value with the mapping function to obtain a mapped luma source value; and
        determining the mapped luma residual value as a subtraction of the mapped luma prediction value and the mapped luma source value.

7. A decoding device comprising at least one processor configured to perform:
    obtaining a chroma prediction value of a chroma source value of a sample of a block of a picture;
    obtaining a value representative of a luma prediction value of a luma source value of the sample;
    decoding a chroma residual value for the sample; and
    determining a reconstructed chroma value for the sample from the decoded chroma residual value and from the chroma prediction value using a mapping function;

wherein determining the reconstructed chroma value comprises:

mapping the chroma residual value to obtain a mapped chroma residual value, wherein the mapping comprises multiplying the chroma residual value by a scaling factor depending on the value representative of the luma prediction value; and obtaining the reconstructed chroma value by adding the mapped chroma residual value to the chroma prediction value.

8. The decoding device of claim 7, wherein the at least one processor is further configured to perform:

obtaining the luma prediction value;

decoding a luma residual value for the sample; and determining a reconstructed luma value for the sample from the decoded luma residual value and from the luma prediction value using both a mapping function and an inverse mapping function that is the inverse of the mapping function;

wherein determining the reconstructed luma value comprises:

mapping the luma prediction value with the mapping function to obtain a mapped luma prediction value;

obtaining an intermediate value representative of a sum of the mapped luma prediction value and the luma residual value; and obtaining the reconstructed luma value by mapping the intermediate value with the inverse mapping function.

9. A non-transitory computer readable storage medium having stored instructions that, when executed by a processor, cause the processor to perform a method of encoding comprising:

obtaining a chroma prediction value of a chroma source value of a sample of a block of a picture;

obtaining a value representative of a luma prediction value of a luma source value of the sample;

determining a mapped chroma residual value from the chroma source value and from the value representative of the luma prediction value using a mapping function; and encoding the mapped chroma residual value into a bitstream;

wherein determining the mapped chroma residual value comprises:

determining a chroma residual value as a difference between the chroma source value and the chroma prediction value; and mapping the chroma residual value with the mapping function to obtain a mapped chroma residual value, wherein the mapping comprises multiplying the chroma residual value by a scaling factor depending on the value representative of the luma prediction value.

10. The non-transitory computer readable storage medium of claim 9, wherein the method of encoding further comprises:

obtaining the luma prediction value;

determining a mapped luma residual value from the luma source value and from the luma prediction value using a mapping function; and encoding the mapped luma residual value into a bitstream;

wherein determining the mapped luma residual value comprises:

mapping the luma prediction value with the mapping function to obtain a mapped luma prediction value;

mapping the luma source value with the mapping function to obtain a mapped luma source value; and determining the mapped luma residual value as a subtraction of the mapped luma prediction value and the mapped luma source value.

11. A non-transitory computer readable storage medium having stored instructions that, when executed by a processor, cause the processor to perform a method of decoding comprising:

obtaining a chroma prediction value of a chroma source value of a sample of a block of a picture;

obtaining a value representative of a luma prediction value of a luma source value of the sample;

decoding a chroma residual value for the sample; and determining a reconstructed chroma value for the sample from the decoded chroma residual value and from the chroma prediction value using a mapping function;

wherein determining the reconstructed chroma value comprises:

mapping the chroma residual value to obtain a mapped chroma residual value, wherein the mapping comprises multiplying the chroma residual value by a scaling factor depending on the value representative of the luma prediction value; and obtaining the reconstructed chroma value by adding the mapped chroma residual value to the chroma prediction value.

12. The non-transitory computer readable storage medium of claim 11, wherein the method of decoding further comprises:

obtaining the luma prediction value;

decoding a luma residual value for the sample; and determining a reconstructed luma value for the sample from the decoded luma residual value and from the luma prediction value using both a mapping function and an inverse mapping function that is the inverse of the mapping function;

wherein determining the reconstructed luma value comprises:

mapping the luma prediction value with the mapping function to obtain a mapped luma prediction value;

obtaining an intermediate value representative of a sum of the mapped luma prediction value and the luma residual value; and obtaining the reconstructed luma value by mapping the intermediate value with the inverse mapping function.

* * * * *